Dec. 17, 1940.  W. J. DAWSON  2,225,260
FASTENER FOR BELT ENDS
Filed April 25, 1939  2 Sheets-Sheet 2
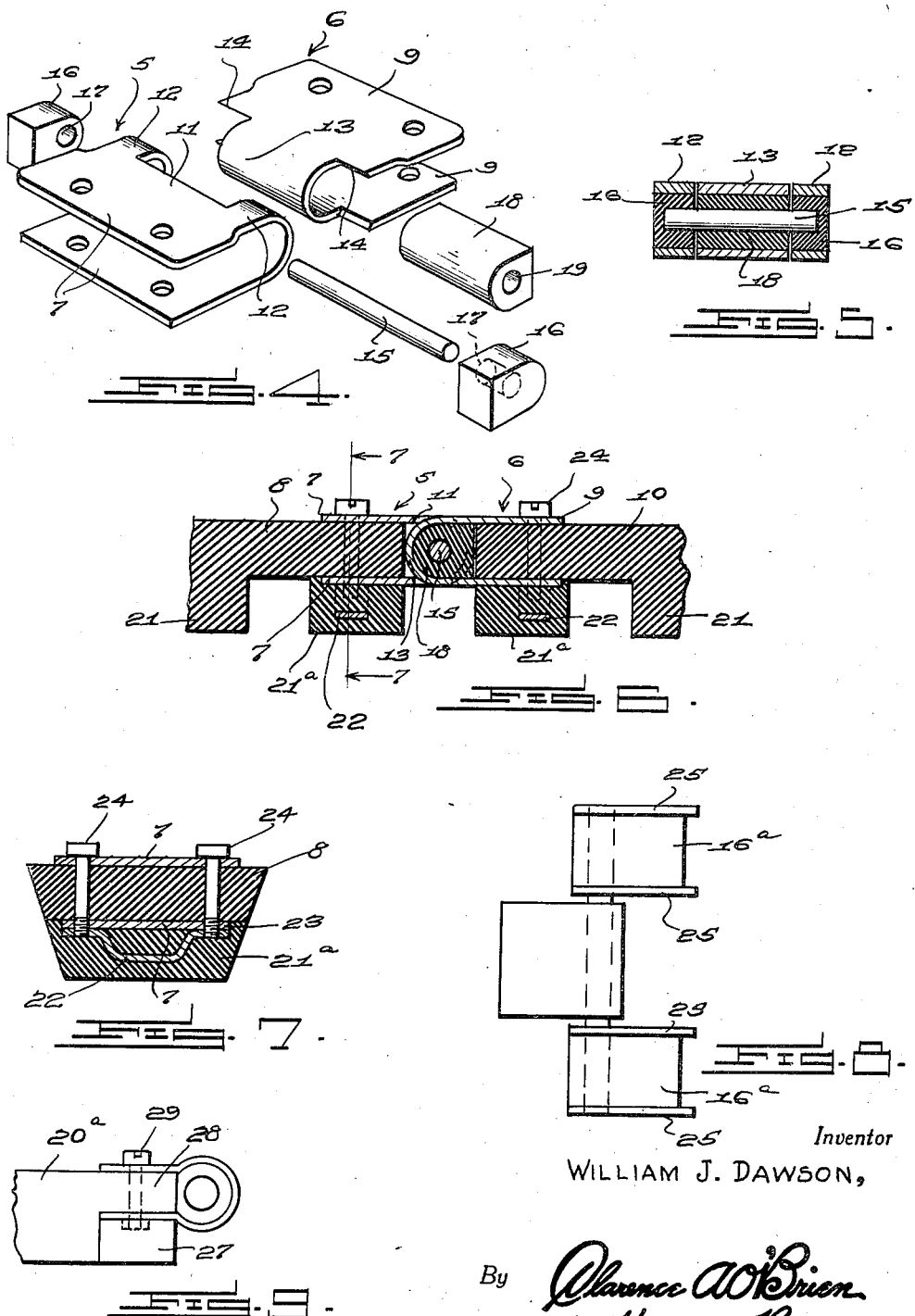
Inventor
WILLIAM J. DAWSON,
By Clarence A. O'Brien
and Hyman Berman
Attorneys Patented Dec. 17, 1940

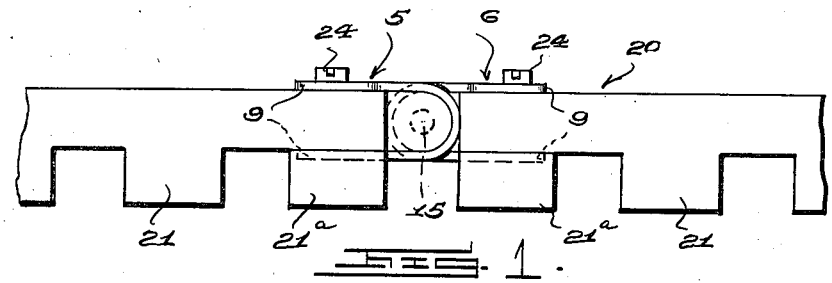
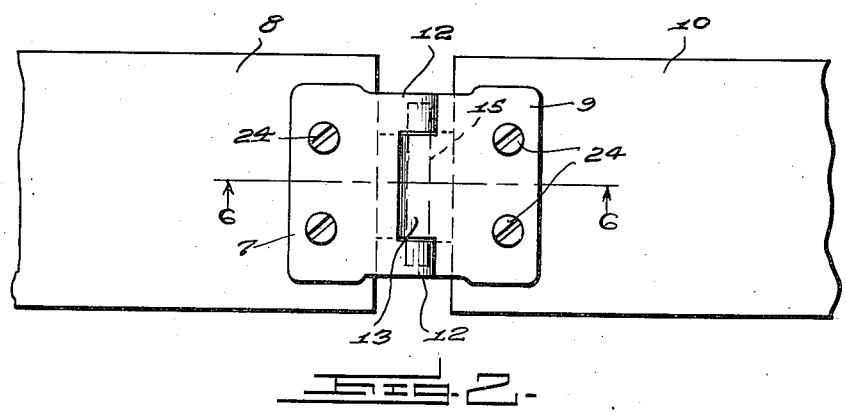
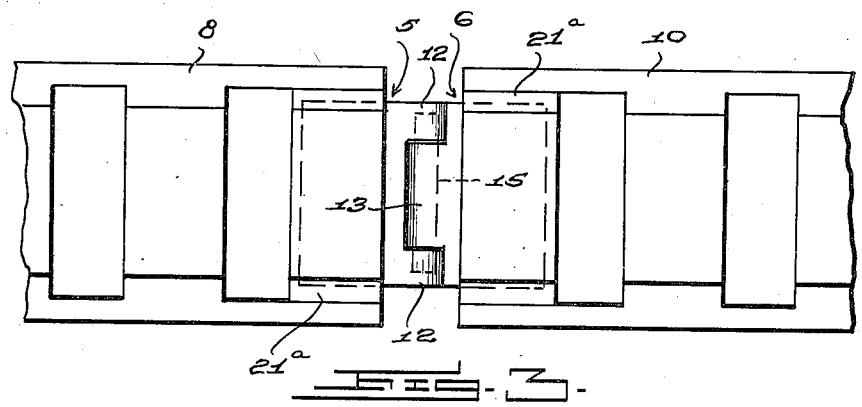

2,225,260

UNITED STATES PATENT OFFICE 2,225,260

FASTENER FOR BELT ENDS

William J. Dawson, Kansas City, Mo.

Application April 25, 1939, Serial No. 269,973

3 Claims. (Cl. 24—33)

This invention relates to endless belts and more particularly to fasteners for securing the ends of such belts together.

An object of the present invention is to provide a belt-end fastener which will overcome most, if not all, of the difficulties now encountered with fasteners as used today for this purpose.

The invention together with its objects and advantages will be best understood from a study of the following description taken in connection with the accompanying drawings wherein:

Figure 1 is a side elevational view illustrating the application of the invention.

Figure 2 is a top plan view thereof.

Figure 3 is a bottom plan view.

Figure 4 is an exploded view of the fastener.

Figure 5 is a detail sectional view through the parts of the fastener joined together.

Figure 6 is a detail sectional view taken substantially on the line 6—6 of Figure 2.

Figure 7 is a detail sectional view taken substantially on the line 7—7 of Figure 6.

Figure 8 is a plan view showing a form of bushing assembly, and

Figure 9 is a side elevational view illustrating the application of the fastener to an end of a toothless belt.

Referring more in detail to the drawings, it will be seen that in the preferred embodiment thereof the fastener comprises a pair of complemental hinge plates 5 and 6 respectively.

Each of the plates 5 and 6, as shown, is formed from a single blank of metal or other suitable material of suitable shape and design and bent upon itself into a substantial U whereby to provide for the plate 5 a pair of apertured attaching flanges 7—7 adapted to receive therebetween an end 8 of the belt; and to provide for the hinge member 6 a similar pair of attaching flanges 9—9 to receive therebetween the complemental end 10 of the belt.

The plate forming the hinge member 7 at the bend in said plate has a portion thereof removed to provide an elongated slot 11 and lugs 12 at opposite ends of the slot; while the plate forming the hinge member 6, at the bend in said plate, has portions thereof removed to provide a substantially semi-cylindrical tongue 13 that complements the slot 11 of the hinge 5 and end notches or recesses 14 that complement and accommodate the semi-cylindrical ears 12 of the hinge member 5.

The fastener also includes a hinge pin 15.

To accommodate the hinge pin 15 there is provided for the hinge member 5, and fitting within the ears 12 of said hinge member 5, bushings 16 formed of rubber, fabric-rubber, or other suitable low friction material and provided with sockets 17 to receive the ends of the pin 15; together with a relatively elongated bushing 18 formed of the same material as that from which the bushings 16 are formed, and accommodated within the trough of the tongue 13; the said bushing 18 having a longitudinal bore 19 therethrough to receive an intermediate portion of the pin 15, as will be clear from a study of Figures 4 and 5.

The bushings 16 and 18, bushings 16 being accommodated within the trough of the ears 12, and bushing 18 being accommodated within the trough of the tongue 13, may be vulcanized or otherwise made fast to the respective hinge members 5 and 6.

In Figures 1, 2, 3, 5, 6 and 7, I have illustrated the fastener as used in securing together the ends 8 and 10 of a belt 20 that is provided on the underside thereof with the usual teeth 21.

In applying the fastener to this form of belt the endmost teeth are first removed to be substituted for by teeth 21a.

Teeth 21a will be formed of the same material as the belt 20 but, as clearly shown in Figure 7, have embedded therein substantially U-shaped reinforcing members 22.

The teeth 21a have in the faces thereof to be applied against the underside of the belt end recesses 23 to accommodate the bottom flanges of the respective hinge members 5 and 6 as shown in Figure 7.

Also, the reinforcing member 22 in each tooth 21a has the terminals thereof laterally extended and provided with threaded apertures to align with the apertures provided in the upper and lower attaching flanges of the hinge members 5 and 6, and to receive the threaded ends of bolts 24 which serve to secure the respective hinge members 5 and 6 to the respective ends 8 and 10 of the belt, and also to secure the teeth 21a to the underside of the belt 20 at said ends 8 and 10 thereof as shown.

It will thus be seen that I have provided a fastener in the form of a hinge which can be readily associated with the ends of a belt and will function to positively fasten or join said ends of the belt together, at the same time permitting the necessary flexibility at said joint between said ends of the belt.

Where it may not be desired to vulcanize the bushings to the hinge members of the fastener, the bushings to be associated with the ears 12 of the fastener 5, may be, as shown in Figure 8, provided at opposite sides thereof with stop flanges or collars 25, the flanges 25 on each bushing, in said Figure 8, indicated by the reference numeral 16a, contacting the opposite ends of the respective ears 12 thus preventing shifting movement of the bushings with respect to said ears.

In Figure 9 is illustrated the manner of applying the fastener to a toothless belt, therein indicated by the reference numeral 20a.

Where the fastener is to be secured to the ends of such a belt, said belt at each end thereof has an under portion 27 thereof first removed, after which the hinge member of the clamp is secured to the end 28 of the belt, said end 28 being accommodated between the flanges of the hinge member, and bolt and nut means 29 being resorted to for securing said flanges engaged with said end 28 of the belt. After the hinge member has been thus secured to the belt end the portion 27 of said belt end previously removed is then positioned in place and cemented or otherwise positively secured in position on the belt end.

It is thought that a clear understanding of the construction, utility and advantages of a belt-end fastener embodying the features of the present invention will be had without a further description thereof.

Having thus described the invention what is claimed as new is:

1. Means for fastening the ends of a belt together comprising a pair of substantially U-shaped members having the limbs spaced apart and the belt ends being reduced to fit between the ends, the bight part of one U-shaped member having a slot therein and the bight part of the other member having its ends cut away to permit said bight portion to fit in the slot, a hinge pin passing through the bight portions for hingedly connecting the two U-shaped members together, blocks placed on the sides of the reduced end portions of the belt and seated on those limbs of the U-shaped parts which engage said reduced ends of the belt and fastening means passing through the limbs of the U-shaped members and into the blocks.

2. Means for fastening together the ends of a belt comprising a pair of substantially U-shaped members having their limbs spaced apart to receive the belt ends, the bight part of one U-shaped member having a slot therein and the bight part of the other member having its ends cut away to permit said bight part to fit in the slot, a hinge pin passing through the bight portions, transversely extending block-like members seated on the limb of the U-shaped members on the traction side of the belt and fastening means for connecting the U-shaped members and blocks to the belt ends.

3. Means for resiliently fastening together the ends of a belt comprising a pair of substantially U-shaped members having their limbs spaced apart to receive the belt ends, the bight part of one U-shaped member having a slot therein and the bight part of the other member having its ends cut away to permit said bight part to fit in the slot, a hinge pin passing through the bight portions, resilient bushings fitting in the bight portions and through which the hinge pin passes, transversely extending block-like members seated on the limb of the U-shaped members on the traction side of the belt and fastening means passing through the limbs of the U-shaped members, the belt ends and into the block-like members.

WILLIAM J. DAWSON.